United States Patent Office 3,255,016

Patented June 7, 1966

3,255,016

DRY ROLL-IN PASTRY MIX

Ervin Gordon Parker, Fox River Grove, Ill., assignor to The Quaker Oats Company, Chicago, Ill., a corporation of New Jersey No Drawing. Filed Sept. 12, 1963, Ser. No. 308,352
7 Claims. (Cl. 99—94)

This invention relates to roll-in pastry mixes and to a method of preparing roll-in pastry.

Roll-in pastries, such as puff pastry, French pastry, and Danish pastry, are made from a laminated dough sheet consisting of a great many very thin alternate layers of fat and dough.

Puff pastry and Danish pastry are discussed in Bakery Technology and Engineering, S. A. Matz, Editor (1960), at pages 304–6 and pages 258–9, respectively. French pastry may be considered puff pastry which is augmented by the addition of frosting and fillings. The preparation of puff pastry and Danish pastry has been similar insofar as layers of fat are interleaved between layers of dough, so that upon baking a separation of dough strata occurs. Puff pastry ingredients usually include no leavening, but, in spite of this, puff paste yields a baked product having an open network of crisp and flaky layers. However, in Danish pastry, yeast leavening and auxiliary ingredients produce a baked product having a soft and porous structure in the dough layers.

Heretofore, methods of preparing roll-in pastries have been cumbersome and have required considerable experience in order to achieve satisfactory results. A crucial step in most presently available methods has been the spreading of fat on a rolled sheet of dough. In many cases the amount of fat added in this manner has been very large and often has equaled the weight of the dough used.

In one traditional method for making Danish-type pastries, a yeast-leavened sweet dough is rolled out into an approximately square sheet. Fat is then spotted on the rolled dough, and the sheet is folded into thirds, as in folding a letter, and is rolled again. The rolled dough is then refrigerated to chill, and the folding and rolling is repeated before a second refrigeration and chilling. After a third folding and rolling, coffee cakes and rolls are formed, often with fruit filling. The dough is allowed to rise in warm, humid conditions and is then baked.

In another conventional method of making Danish-type pastry goods, a chemically leavened dough is rolled into an approximately square sheet, and beginning at one end of the sheet a layer of fat is spread on approximately two-thirds of the sheet surface. The ungreased third is then folded over on the middle greased portion, and the remaining one-third which has been covered with fat is folded on top of the ungreased surface. The folded dough is then rolled again to produce a sheet consisting of three thin layers of dough separated by two layers of fat. The new sheet is then spread again with fat and folded again as before, and the rolling, fat-spreading, and folding steps are continued for a number of times. The final laminated sheet is then shaped into coffee cakes, rolls and the like.

Puff pastry has been conventionally made in a manner similar to Danish pastry, except, as mentioned above, the puff pastry is not usually leavened. In a so-called rapid puff pastry method a dough ball is formed from ingredients including fat, flour, salt, and water, and then a large quantity of fat is "blitzed" into the dough ball. In the "blitz" method the fat is blended into the dough ball by a slow-speed mixer, and the resulting dough is then rolled and folded in much the same way as traditional puff pastry or Danish pastry. In the blitz method, fat is not spread on the rolled sheet.

Many dry prepared mixes have been made available to housewives, institutions and bakeries for the preparation of a wide variety of bakery goods. As used herein, the term "dry" does not means anhydrous and is intended to connote only that the material is free flowing. These mixtures eliminate the necessity of measuring ingredients and have become very popular. Considerably less experience is required in order to achieve satisfactory results with these mixes, and less time is required to prepare the baked goods. Complete pie crust pastry mixes have been available heretofore. These mixes are usually a mixture of dry ingredients and small particles of lard. While these mixes are suitable for pie-crust pastry, there have been no complete mixes from which roll-in pastry can be prepared. The so-called Danish-type mixes heretofore available have been merely sweet dough type mixes from which a dough is prepared. This dough is then treated in the traditional manner, with the spreading of fat on the rolled sheets and the like. Hence, although these heretofore available Danish pastry mixes do relieve the user of the necessity of measuring many of the ingredients, they do not eliminate what many people consider the most objectionable steps, namely, the measuring of fat and the spreading of fat on the rolled dough.

Prior to this invention, therefore, there has been no complete prepared bakery goods mix from which roll-in pastry such as Danish-type bakery goods and puff pastry can be prepared, and there has been no method of producing Danish pastry goods which does not involve spreading of fat on a sheet of dough.

Hence, it is an object of this invention to provide a dry, complete, roll-in-type pastry mix which can be easily used to provide a finished product having the desirable layered open texture characteristic of roll-in-type pastry.

Another object of this invention is to provide a novel method by which roll-in-type pastry can be prepared without the necessity of measuring fat or spreading fat on a rolled sheet of dough.

Another object of this invention is to provide a complete prepared roll-in pastry mix which eliminates the measuring of fat in conjunction with its use.

A further object of this invention is to provide a novel roll-in-type pastry mix and method of producing roll-in-type pastry which will be readily usable by bakeries, institutions and housewives.

These and other objects which will be apparent hereinafter are obtained in accordance with this invention by a method comprising (1) admixing water and a novel roll-in-type pastry mix of this invention, said mix comprising flour and fat, said fat having a melting point of not less than 110° F., having solid fat indices in the ranges specified in Table I, below, and being in the form of discrete particles having at least one internal dimension greater than about 0.6 inch, said admixing being sufficient to blend said water and said flour without pulverizing the fat particles and resulting in a dough containing large discrete particles of fat, (2) rolling the dough formed by step 1 into a thin sheet, and (3) folding the dough sheet formed by step 2.

Unless otherwise indicated, the melting points referred to herein are determined by the capillary tube method Cc 1–25 of the American Oil Chemists' Society (A.O.C.S.). The solid fat indices (S.F.I.) referred to herein are determined by the A.O.C.S. tentative method Cd 10–57 (corrected 1961).

Fats which are useful in this invention include margarines, shortenings, and other fat compositions having melting points not less than about 110° F. and having solid fat indices in the ranges specified in Table I.

TABLE I.—SOLID FAT INDICES OF FATS USEFUL IN THIS INVENTION

| Temperature, ° F. | Minimum S.F.I. | Maximum S.F.I. |
|---|---|---|
| 50 | 23 | 43 |
| 70 | 18 | 34 |
| 80 | 17 | 33 |
| 92 | 15 | 28 |
| 100 | 12 | 24 |
| 110 | 6 | 17 |

These fat compositions may also contain lecithin, monoglycerides and other ingredients. Fat compositions which contain about 9–10% water by weight are preferred.

A large number of fat mixtures and compositions are known as puff pastry margarines and shortenings. These are particularly tough and waxy fats having high melting points and usually having a wide plastic range. It is said that they usually consist of a blend of liquid oil with a high percentage of hard fat, as for example, 65% cottonseed oil and 35% oleostearin. Puff-pastry shortening is said to be similar to puff-pastry margarine except that it generally contains water instead of milk. Shortenings and margarines of this type which have a melting point not less than 110° F. and which have solid fat indices in the ranges specified in Table I are examples of fat compositions which are useful in this invention.

The fat particles can be added in the form of extrusions. Cut rodlike pieces of fat about an inch long and having a diameter of approximately one-quarter inch are satisfactory when used in the mix of this invention. However, the use of rods about an inch long and having a diameter of about one-half inch is more preferable. Sheets of fat may be cut into appropriate sizes with a wire screen. Cubes of fat having between 0.5 inch and about one inch on an edge, or balls of fat having between 0.6 inch and about 1.2 inches diameter, are entirely satisfactory for use in this invention. Mixes which use no fat particles having an internal dimension greater than about 0.6 inch do not lead to a satisfactory open, layered structure characteristic of roll-in pastry, but rather lead to a short, comparatively dense, flaky structure somewhat comparable to that of pie-crust pastry. Particles of fat having an internal dimension somewhat greater than two inches can be used in the mix of this invention, but they are much less desirable. Mixes of this invention which utilize fat particles having at least one internal dimension between about 0.6 inch and 1.2 inches are preferred. Fat particles having a volume between about 0.05 cubic inch and about one cubic inch are preferred, and those having between about 0.1 and 0.5 cubic inch are more preferred.

The use of the term "discrete particles" is intended to denote that there is a minimum of wicking, creaming, or greasing of the fat into the other dry ingredients but is not intended to connote that there is none. It has been found that a small portion of the other ingredients of the mix appears to embed itself on the surface of the discrete fat particles during addition of the fat to the dry ingredients in this invention.

It is understood that a major portion and preferably substantially all of the fat in the mix is of the character described herein and in the appended claims. Generally little fat, if any, is used in the mix of this invention other than the fat which melts above 110° F., has solid fat indices within the ranges specified in Table I, and which is present in the form of discrete particles. The quantity of the solid fat used may also vary considerably, although an amount between about 20% and 35% by weight based on the weight of the entire dry mix is generally used in Danish pastry mixes, and an amount between about 40% and about 50% is generally used in puff pastry mixes. However, the amount of fat may be varied beyond these limits without departing from this invention.

The Danish-type pastry mix of this invention is a mix comprising flour, fat, and leavening, said fat having a melting point of not less than 110° F., having solid fat indices in the ranges specified in Table I, and being in the form of discrete particles having at least one internal dimension greater than about 0.6 inch. The Danish-type mix of this invention can be yeast-leavened or chemically leavened and can vary considerably in composition.

For the nonfat dry ingredients one can employ flour, such as regular bread flour, and other normally available bakery ingredients, such as dry powdered eggs, dry powdered milk, salt, sugar, etc. Dry yeast or dry nonyeast leavening agents can also be used. Other ingredients, including flavoring, decorative ingredients and the like, can be incorporated in the mix or may be added to the rolled dough. Any of the so-called Danish pastry mixes of the prior art may be used as the powdered ingredient portion of the Danish pastry mix of this invention. Recipes for well-known sweet doughs are also eminently satisfactory for use in preparing the "nonfat" powdered portion of the Danish pastry mix of this invention.

A preferred Danish pastry mix of this invention is the dry prepared mix comprising about 50% by weight wheat flour, about 32% by weight fat, said fat being in the form of discrete particles having at least one internal dimension greater than 0.6 inch, having a melting point not less than 110° F., and having solid fat indices in the ranges specified in Table I, about 4% by weight buttermilk solid, about 4% by weight sucrose, about 4% by weight dextrose, about 1.7% by weight dried egg yolk, about 1.25% by weight soda, about 0.75% by weight gluconodelta lactone, about 0.75% by weight sodium aluminum phosphate, and about 0.25% by weight egg white.

The puff-type pastry mix of this invention is a mix comprising flour and fat, said fat having a melting point of not less than 110° F., having solid fat indices in the ranges specified in Table I, and being in the form of discrete particles having at least one internal dimension greater than about 0.6 inch. The puff-type pastry mix is preferably unleavened, and it preferably contains salt. The limits of the size of fat particles are the same for the puff-type pastry mix as those referred to above for the Danish-type mix of this invention. The puff-type pastry mixes of this invention preferably contain the fat in an amount between about 40% and about 50% by weight based on the weight of the entire mix. However, it is clear that the amount of fat may be varied beyond these limits without departing from the invention.

A preferred puff pastry mix of this invention is a dry prepared mix comprising about 50 parts by weight wheat flour, about 0.5 part by weight salt, and about 40 parts by weight of fat, said fat being in the form of discrete particles having at least one dimension greater than about 0.6 inch, having a melting point not less than 110° F., and having solid fat indices in the ranges speciled in Table I.

It is clear from the above, and from the numbered examples below, that it is of utmost importance that the mix be manufactured using a process step sequence and process equipment which assures minimum breakup of the discrete fat particles and minimum greasing of the powdered ingredients. The blending of the powdered nonfat ingredients of the mix of this invention is preferably completed before the fat particles are added. The blending of the fat particles with the powdered ingredients is preferably the last step prior to packaging. To be in accord with this invention the blending of the discrete fat particles with the powdered ingredients must be carried out in any manner which will disperse the discrete fat particles throughout the powdered ingredients without substantially reducing the size of the discrete fat particles and without substantial greasing of the powdered ingredients.

The mixes of this invention can be used by bakeries, institutions, and by housewives, without measuring fat or spreading fat on rolled sheets of dough. When these mixes are gently mixed with water, the fat particles remain as discrete particles, and a minimum of greasing of the dough occurs. Sufficient water is added to provide a dough ready extensibility. That is, enough water is added to the mix to provide a dough soft enough to roll out readily but tough and coherent enough so that the rolled sheets will not easily tear or come apart in handling. Mixing must be terminated when a dough is formed and is not continued more than necessary to form a dough. If mixing of the dough were prolonged, or if severe mixing is employed, the fat particles will be greased into the dough and the desired roll-in pastry structure will not be achieved.

The dough prepared in accordance with the teachings of this invention is removed from the mixer and rolled out on a flat surface to form a thin sheet. Sheet thicknesses less than 0.3 inch are preferred. The sheet is folded. The folding and rolling steps may be repeated several times if desired. No spreading of fat on the sheets of rolled dough is necessary.

The final rolled dough can be cut into various shapes, filled with nuts, almonds, rich fruit mixtures, and decorated. The variety of decorations and ornamentations which can be used is as unlimited as the imagination of the worker.

The formed pastry dough is then baked until done. Usually between 20 and 30 minutes are sufficient.

The invention will be further illustrated but not limited by the following examples, in which the quantities stated are in parts by weight unless otherwise indicated.

*Example 1.—Manufacture of Danish-type mix*

The following approximate quantities of dry ingredients were placed in a mixer and mixed for four to five minutes:

| | Parts |
|---|---|
| Bleached wheat flour | 495.0 |
| Buttermilk solids | 40.0 |
| Sugar (sucrose, ready-mix grade) | 40.0 |
| Dextrose | 40.0 |
| Dried egg yolk | 17.0 |
| Sodium bicarbonate | 12.5 |
| Salt (sodium chloride) (ready-mix grade) | 10.0 |
| Dry active yeast (fine grind) | 8.0 |
| Gluconodelta lactone | 7.5 |
| Sodium aluminum phosphate | 7.5 |
| Egg whites, spray dried | 2.5 |

To the above blended ingredients was added 320 parts of a sheeted shortening sold as "Puff-Do" and composed of animal fats and vegetable oils, water and salt and having not more than one-half of 1% by weight of lecithin and monostearine. The melting point of this shortening was about 126° F.±2° F. (Wiley method), and the S.F.I. values were about 33 at 50° F., 28 at 70° F., 26 at 80° F., 24 at 92° F., 21 at 100° F., and 14 at 110° F. The sheeted shortening had been stored at about 45° F., and individual one-inch sheets were placed on a wire grid. A roller was pressed over the top of the sheeted shortening so as to press it through the wires, thereby producing discrete fat particles approximately ½" x ½" x 1". The paper was lifted off the grid and another sheet of shortening placed on the grid. The cut shortening pieces were collected in a tub and the required amount was dumped on top of the above dry, blended ingredients and blended therewith for 30–40 seconds. The "blending" of the fat particles with the dry ingredients was done gently so as to merely disperse the discrete fat particles throughout the powdered ingredients without substantially reducing the size of the discrete fat particles and without substantial greasing of the powdered ingredients.

To test the storage stability of the resulting complete Danish pastry mix, portions of the mix were subjected to hot-room storage tests. The mix was found to be stable at temperatures as high as 110° F. for at least four to five months. During this time there was no appreciable greasing or wicking of the powdered components of the mix. Moreover, no rancidity was detected in the mix after this storage period, as measured by off-flavor or by chemical analysis.

*Example 2.—Use of the Danish-type mix*

About 500 parts of the mix manufactured according to Example 1 was placed in a mixing bowl and about 350 parts of water added thereto when the mixer was started at low speed. The mixer was run for only 20 seconds at low speed and about 15 seconds at medium speed. The result was a readily extensible dough containing large, discrete fat particles, i.e., of approximately the same size as the particles in the prepared mix. The dough was dumped out of the mixing bowl onto a well-floured bench, and rolled into a rectangle and given four folds. The dough was then rolled out and made up to various Danish rolls and coffee cakes with various fruit fillings.

The rolls and cake were placed in a baking pan, allowed to set for ten minutes at room temperature, and placed in a 375° F. oven for about 22–28 minutes, depending on the size of the roll and the amount of filling used. The resulting rolls and cakes had a tender layered texture characteristic of Danish-type pastry. It will be appreciated that the particular mix produced above has both yeast and chemical leavening ingredients. The particular combination shown above is unique in that it produces a product having a yeast flavor and raised, open, porous structure similar to that of a yeast-leavened product, and yet the leavening action is faster and more convenient than that of a yeast product.

*Example 3.—Manufacture of a puff-pastry-type mix*

The following approximate quantities of dry ingredients were placed in a mixer and mixed thoroughly:

| | Parts |
|---|---|
| Bleached wheat flour | 50 |
| Salt | 0.5 |

To the above mixed ingredients was added 40 parts of the shortening which was used in Example 1. The shortening was cut to approximately the same size and shape as in Example 1, and was dispersed in the dry ingredients without substantially reducing the size of the discrete fat particles and without substantially greasing the other dry ingredients. The complete mix was then packaged as a complete puff-type pastry mix.

*Example 4.—Use of puff-type pastry mix*

The mix prepared in Example 3 is added to a conventional mixer, and 40 parts of water added thereto. The mixer is run at slow speed for one minute, thereby producing a readily extensible dough containing large discrete particles of fat. This dough is then laid on a bench and rolled and folded in much the same manner as that illustrated in Example 2 for Danish pastry. The rolled and folded puff pastry sheet is then shaped into rolls and pastries and baked in a 420° F. oven for about 30 minutes. The resulting baked product has the very open network of crisp and flaky layers characteristic of puff pastry.

I claim:

1. A dry, complete roll-in type pastry mix comprising flour and fat, substantially all of said fat having a melting point of not less than 110° F., having solid fat indices (S.F.I.) in the ranges specified in the following table:

| Temperature, ° F. | Minimum S.F.I. | Maximum S.F.I. |
|---|---|---|
| 50 | 23 | 43 |
| 70 | 18 | 34 |
| 80 | 17 | 33 |
| 92 | 15 | 28 |
| 100 | 12 | 24 |
| 110 | 6 | 17 |

and being in the form of discrete particles, said particles having a volume between about 0.05 cubic inch and about 1 cubic inch and having at least one internal dimension greater than about 0.6 inch, said fat being sufficient to form a roll-in type pastry.

2. A mix as in claim 1 in which said particles have a volume between about 0.1 and about 0.5 cubic inch.

3. A dry, prepared Danish-type pastry mix comprising: about 50% by weight wheat flour; about 32% by weight fat, substantially all of said fat being in the form of discrete particles, said particles having a volume between about 0.05 cubic inch and about 1 cubic inch and having at least one internal dimension greater than 0.6 inch, having a melting point not less than 110° F., and having solid fat indices (S.F.I.) in the ranges specified in the following table:

| Temperature, °F. | Minimum S.F.I. | Maximum S.F.I. |
|---|---|---|
| 50 | 23 | 43 |
| 70 | 18 | 34 |
| 80 | 17 | 33 |
| 92 | 15 | 28 |
| 100 | 12 | 24 |
| 110 | 6 | 17 |

about 4% by weight buttermilk solids; about 4% by weight sucrose; about 4% by weight dextrose; about 1.7% by weight dried egg yolk; about 1.25% by weight soda; about 1% by weight salt; about 0.8% by weight dry active yeast; about 0.75% by weight gluconodelta lactone; about 0.75% by weight sodium aluminum phosphate; and about 0.25% by weight egg white.

4. A dry, prepared puff pastry mix comprising: about 50 parts by weight flour; about 0.5 part by weight salt; and about 40 parts by weight of fat, substantially all of said fat being in the form of discrete particles, said particles having a volume between about 0.05 cubic inch and about 1 cubic inch and having at least one dimension greater than about 0.6 inch, having a melting point not less than 110° F., and having solid fat indices (S.F.I.) in the ranges specified in the following table:

| Temperature, °F. | Minimum S.F.I. | Maximum S.F.I. |
|---|---|---|
| 50 | 23 | 43 |
| 70 | 18 | 34 |
| 80 | 17 | 33 |
| 92 | 15 | 28 |
| 100 | 12 | 24 |
| 110 | 6 | 17 |

5. A mix as in claim 4 in which said particles have a volume between about 0.1 and 0.5 cubic inch.

6. A dry, prepared Danish-type pastry mix comprising flour, fat and leavening, substantially all of said fat having a melting point of not less than 110° F., having solid fat indices (S.F.I.) in the ranges specified in the following table:

| Temperature, °F. | Minimum S.F.I. | Maximum S.F.I. |
|---|---|---|
| 50 | 23 | 43 |
| 70 | 18 | 34 |
| 80 | 17 | 33 |
| 92 | 15 | 28 |
| 100 | 12 | 24 |
| 110 | 6 | 17 |

and being in the form of discrete particles, said particles having a volume between about 0.05 cubic inch and about 1 cubic inch and having at least one internal dimension greater than about 0.6 inch, said fat being sufficient to form a Danish-type pastry.

7. A mix as in claim 6 in which said particles have a volume between about 0.1 and 0.5 cubic inch.

References Cited by the Examiner

UNITED STATES PATENTS

| | | | |
|---|---|---|---|
| 2,522,591 | 9/1950 | Wilson et al. | 99—92 |
| 2,686,721 | 8/1954 | Callaghan et al. | 99—94 |

OTHER REFERENCES

Matz, Bakery Technology and Engineering, 1960, pp. 258, 259, 304, 305, The Avi Publishing Company, Inc., Westport, Conn.

A. LOUIS MONACELL, *Primary Examiner.*

RAYMOND N. JONES, *Examiner.*